United States Patent [19]

Yatsunami

[11] Patent Number: 4,884,146
[45] Date of Patent: Nov. 28, 1989

[54] IMAGE DISPLAY SYSTEM

[75] Inventor: Kenroh Yatsunami, Yamatokoriyama, Japan

[73] Assignee: Sharp Kabushiki Kaisha, Osaka, Japan

[21] Appl. No.: 218,991

[22] Filed: Jul. 14, 1988

[30] Foreign Application Priority Data

| Jul. 14, 1987 | [JP] | Japan | 62-175201 |
| Jul. 14, 1987 | [JP] | Japan | 62-175202 |
| Jul. 14, 1987 | [JP] | Japan | 62-175203 |
| Jul. 14, 1987 | [JP] | Japan | 62-175204 |
| Jul. 14, 1987 | [JP] | Japan | 62-175205 |

[51] Int. Cl.$^4$ .............................................. H04M 1/00
[52] U.S. Cl. .................... 358/400; 358/486; 358/494
[58] Field of Search ................. 358/256, 280, 293, 294

[56] References Cited

U.S. PATENT DOCUMENTS 4,751,584  6/1988  Midorikawa ..................... 358/293

FOREIGN PATENT DOCUMENTS 48-56393  8/1973  Japan .
57-27463  6/1982  Japan .

Primary Examiner—Edward L. Coles, Sr.
Attorney, Agent, or Firm—Birch, Stewart, Kolasch & Birch

[57] ABSTRACT

An image display system includes an image reading device for reading information. This image display system is capable of displaying the information read by the image reading device. The system also allows the writing of information onto a display board. The information being displayed can be copied for outputting to a printer or a word processor for printing a hardcopy or storing onto a magnetic medium, respectively.

20 Claims, 9 Drawing Sheets

| DEVELOPING SCHEDULE | | | |
|---|---|---|---|
| ITEM | ST. | COMP. | CHG. |
| CONT. CKT. | | | |
| STR. DEGN. | | | |
| STR. TR. P. | | | |
| SOFT. | | | |
| OV. TEST | | | |

ORIGINAL DOCUMENT.

DISPLAY

WRITING

| DEVELOPING SCHEDULE | | | |
|---|---|---|---|
| ITEM | ST. | COMP. | CHG. |
| CONT. CKT. | 2/9 | 3/8 | Mr. A |
| STR. DEGN. | 2/10 | 3/8 | Mr. B |
| STR. TR. P. | 3/10 | 3/30 | Mr. C |
| SOFT. | 2/9 | 3/8 | Mr. D |
| OV. TEST. | 4/1 | 4/20 | Mr. E |

PRINTING OUTPUT

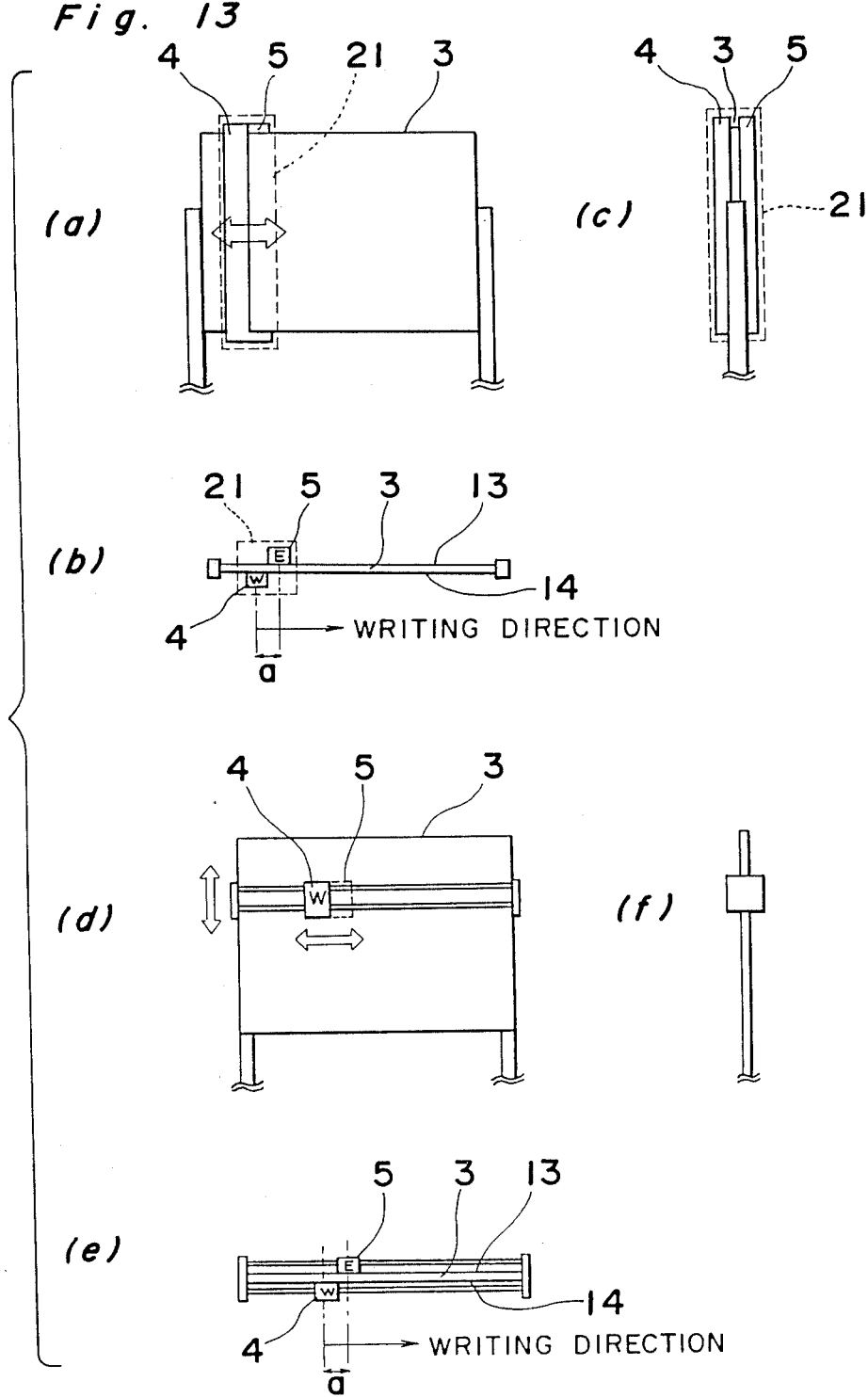

IMAGE DISPLAY SYSTEM

BACKGROUND OF THE INVENTION

The present invention generally relates to a display arrangement, and more particularly, to an image display system which is capable of displaying image information written on a sheet of paper or the like, on a display board, and also, capable of printing the image information displayed on the display board onto a sheet of paper, etc.

Recently, there has been proposed a so-called electronic blackboard capable of copying an image written on a board, so as to replace a conventional blackboard. The electronic blackboard referred to above is so arranged as to read the image hand-written on a white board or the like, for example, with a felt tipped pen, by an image reading device and for printing the read information through a printing unit. This electronic blackboard is convenient to use, since an operator is not required to manually copy the image written on the board into a notebook, etc.

Meanwhile, as a means for simultaneously transmitting information of data preliminarily prepared to a large number of listeners, there has been proposed an apparatus called an overhead projector (referred to as an OHP hereinafter), which is arranged to enlarge and project by light, the information printed or written on a transparent sheet, and is also convenient to use, since it becomes possible to explain the data by use of a pointing rod, without the necessity for preliminarily distributing data to the audience.

Moreover, there has also been conventionally proposed, for example, in Japanese patent publication (Tokkosho) No. 57-27463, a magnetic migration display board which is arranged to display data through utilization of magnetic migration.

However, the conventional arrangements as referred to above respectively have various disadvantages as follows.

In the electronic blackboard, for example, in order to transmit the preliminarily prepared data to many people, it is necessary to manually transcribe the data onto the electronic blackboard or to preliminarily copy the data for distribution to the audience.

The OHP also has problems in that the projected image can not be copied for distribution, original documents formed by transparent sheets are required, and it is necessary to darken the room for the projection by light.

Furthermore, the magnetic migration display system has a problem such that when the information displayed on the display unit is required to be rewritten, much time is taken because a new information can only be displayed after once completely erasing the information on the display unit by an erasing head.

SUMMARY OF THE INVENTION

Accordingly, an essential objective of the present invention is to provide an image display system, which is capable of displaying information written on an original document, onto a display board based on the principle of magnetic migration display. The method which effects the displaying by magnetic force is accomplished through application of a magnetic field to a plastic fluid substance dispersed with magnetic particles therein, (as disclosed, for example, in Japanese patent laid-open publication (Tokkaisho) No. 48-56393 and Japanese patent publication (Tokkosho) No. 57-27463, etc.), the present invention is capable of printing the image information displayed on the display board onto a sheet of paper or the like.

Another important objective of the present invention is to provide an image display system of the above described type, which is so arranged that in a direction for writing the image information, an image erasing means is provided in a position preceding an image recording means so as to effectively enable to effect recording immediately after the erasure of the information, thus making it possible to rewrite the information quickly.

A further objective of the present invention is to provide an image display system of the above described type, particularly requiring a short time for the rewriting of the information.

A still further objective of the present invention is to provide an image display system of the above described type, which is capable of manually writing data on the display board with a felt tipped pen or the like.

In accomplishing these and other objectives, according to one preferred embodiment of the present invention, there is provided an image display system which includes an reading means for reading image information, a display means which is capable of displaying the information read by said image reading means, and also capable of writing information, and a copying means for printing out the information displayed on or written in said display means.

By the image display system having the construction as described above, it is possible to read the information written on a sheet of paper, etc. by the image reading means so as to display it by the display means.

It is also possible to print out the information displayed on or written in the display means, by the copying means.

In another aspect of the present invention, there is provided an image display system which includes an image display means for displaying information, an image recording means for writing information into said image display means, and an image erasing means provided in a position preceding said image recording means with respect to a direction for information writing, for erasing the information displayed on said image display means, with said image erasing means being arranged to scan over said image display means by preceding said image recording means.

By the above arrangement of the present invention, since the image erasing means is adapted to scan over the image display means by preceding the image recording means, it is possible to display fresh information immediately after erasure of the image information.

In a further aspect of the present invention, there is provided an image display system which includes an display means for displaying image information, an recording means for writing image information in said image display means, an image reading means for reading the information written in said image display means, and an erasing means for erasing the image information written in said image display means.

By the above arrangement of the present invention, it is possible to read the information on the image display means by the image reading means, while the image reading means, image recording means and image erasing means may be simultaneously driven for scanning.

In a still further objective of the present invention, there is provided an image display system which includes an display means for displaying image information, an recording means for writing image information in said image display means, an image reading means for reading the information written in said image display means, and an image erasing means for erasing the information written in said image display means, with said image recording means, said image reading means, and said image erasing means being arranged to simultaneously scan over said image display means.

By the above construction of the image display system, according to the present invention, the image recording means, image reading means, and image erasing means are adapted to be driven for scanning over the image display means at the same time.

In another aspect of the present invention, the information is arranged to be displayed and erased on said display means based on a principle of causing magnetic particles to migrate through application of magnetic force to said display means, and to be capable of being manually written thereon by a hand-writing means such as a felt-tipped pen and the like.

Thus, by the above arrangement of the present invention, the display and erasing of the information may be accomplished by causing the magnetic particles to migrate through application of a magnetic force, while the information can also be written by a felt tipped pen and the like.

BRIEF DESCRIPTION OF THE DRAWINGS

These and other objectives and features of the present invention will become clear from the following description taken in conjunction with the preferred embodiments thereof with reference to the accompanying drawings, in which:

FIGS. 13(a) through 13(f) are schematic diagrams showing a positional relation between the magnetic recording head and the magnetic erasing head in two types of carriages which may be employed in the arrangement of FIG. 1.

DETAILED DESCRIPTION OF THE INVENTION

Figure 1:
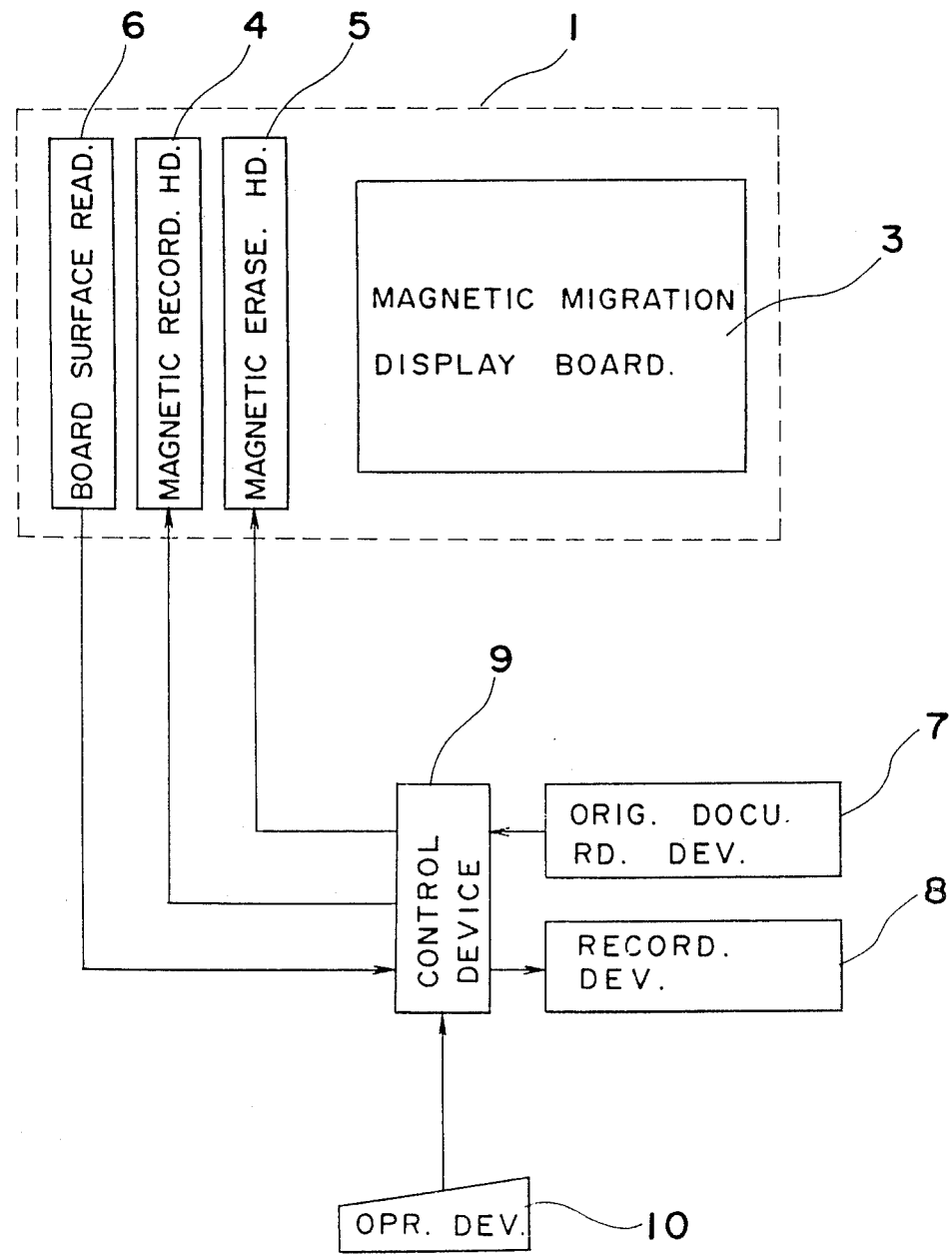
FIG. 1 is a block diagram showing a general construction of an image display system according to one preferred embodiment of the present invention.

Before the description of the present invention proceeds, it is to be noted that like parts are designated by like reference numerals throughout the accompanying drawings.

Referring now to the drawings, FIG. 1 shows a block diagram construction of an image display system according to one preferred embodiment of the present invention. The system generally includes a board section 1 for carrying out the reading, writing and erasing of information, shown by the dotted lines. The system further includes a magnetic migration display board 3, a magnetic recording head device 4 for displaying (writing) information on the display board 3, a magnetic erasing head device 5 for erasing information displayed on the display board 3, a board surface reading device 6 for reading information displayed on the display board 3, an original document reading device 7 for reading information written on a sheet of paper or the like (referred to merely as a paper sheet hereinafter); and a recording device 8 for printing (hard copy) the information read by the board surface reading device 6 or the original document reading device 7. The devices 7 and 8 are coupled with the magnetic recording head device 4, the magnetic erasing head device 5 and the board surface reading device 6 through a control device 9, to which an operating device 10 is connected for operating this image display system.

Figure 2:
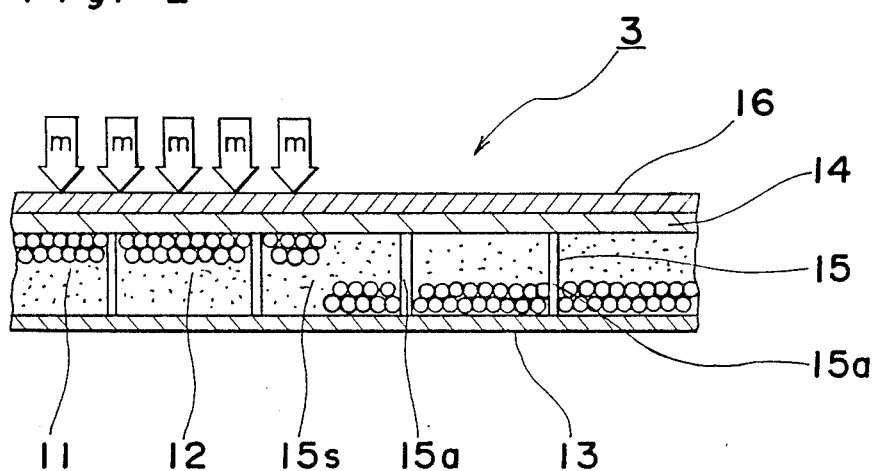
FIG. 2 is a fragmentary cross sectional view of a magnetic migration display board employed in the arrangement of FIG. 1.

Referring particularly to FIG. 2, one example of the construction for the magnetic migration display board 3 will be described below.

In FIG. 2, the display board 3 comprises a front face sheet 14, a reverse face sheet 13, a honeycomb core 15 provided between the front and reverse face sheets 14 and 13 so as to divide a space therebetween into sections 15s by its walls 15a, and a special plastic liquid 11 enclosed in each of the sections 15s and dispersed therein with magnetic particles 12. A processed layer 16 is further formed over the front face sheet 14, for example, a surface finishing of Teflon (name used in trade and manufactured by Du Pont) so as to impart a function of a white board upon the display board 3.

The plastic liquid 11 referred to above is a liquid which does not flow unless an external force over a certain level is applied thereto, and the magnitude of the force equivalent to such external force is referred to as a yielding value. Now, upon application of a magnetic force m exceeding the yielding value to the display board 3 from the outside, the magnetic particles 12 dispersed within the plastic liquid 11 are moved in the direction along which the magnetic force is applied. Accordingly, by alternately applying a magnetic force to the display board 3 from its sides at the front face sheet 14 and the reverse face sheet 13, as described above, the magnetic particles 12 are displaced towards the front face sheet 14 and the reverse face sheet 13, and thus, displaying and erasing of data may be readily accomplished. More specifically, upon application of the magnetic force from the side of the front face sheet 14 of the magnetic migration display board 3 by the magnetic recording head device 4, the magnetic particles 12 are caused to migrate to the front surface of the display board 3, and thus, the image can be displayed.

Meanwhile, by applying the magnetic force from the side of the reverse face sheet 13 of the display board 3 by the magnetic erasing head device 5, the magnetic particles 12 migrate towards the reverse surface of the display board 3, and the displayed image can be erased. On the other hand, the Teflon processing layer 16 is applied through consideration of its characteristics for adhesion or wiping off of pigments with respect to the board surface, and also durability of the board surface for utilizing the display board 3 as a white board, whereby hand-writing and erasing, for example, by a felt tipped pen can be readily accomplished.

Figure 3:
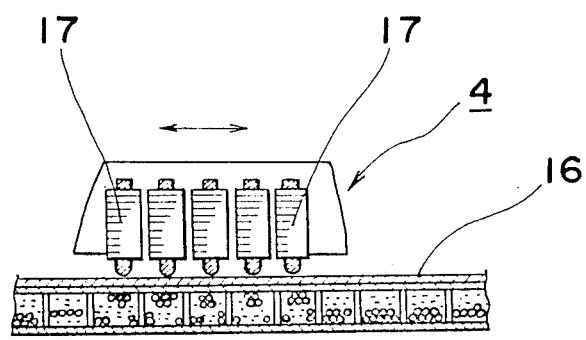
FIG. 3 is a fragmentary side sectional view showing construction of a magnetic recording head employed in the arrangement of FIG. 1.
Figure 4:
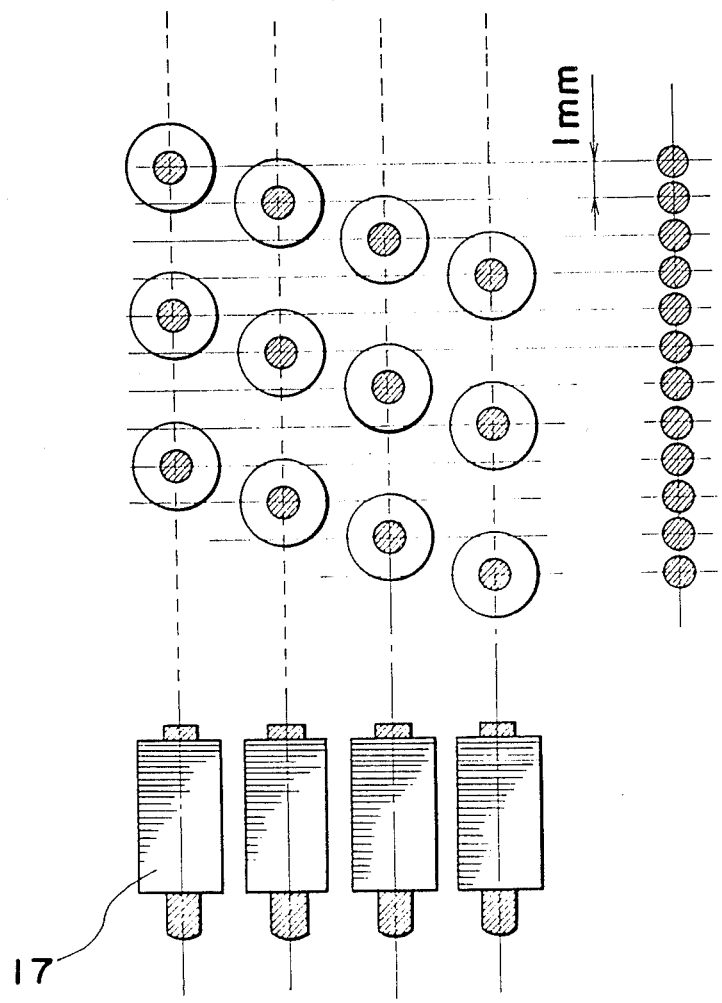
FIG. 4 is a schematic diagram showing disposition of electromagnets for the magnetic recording head employed in the arrangement of FIG. 1.

As shown in FIG. 3, the magnetic recording head device 4 includes a group of electromagnets 17 provided to confront and contact the magnetic migration display board 3 for relative displacement with respect to the display board 3, and in order to allow characters, images, etc. to be formed on the display board 3 as in a general printer of a dot drawing type, the individual electromagnets 17 are adapted to be selectively driven. By way of example, if the dot density of the magnetic migration display board 3 is set at 1 dot/mm, it is necessary to arrange the group of electromagnets 17 at a pitch of 1 mm, but due to the restriction of by the configuration of the electromagnets 17, the group of electromagnets may be so arranged as shown in FIG. 4, thereby to realize 1 dot/mm equivalently.

Although not particularly shown, the magnetic erasing head device 5 located at the side of the reverse face sheet 13 of the magnetic migration display board 3 has the construction generally similar to that of the recording head device 4, and is arranged to accomplish the erasing by selectively driving the individual electromagnets (not shown) in the region required to be erased. As a modification, the magnetic erasing head device 5 as referred to above may be replaced by a group of permanent magnets (not shown) arranged to selectively contact any desired region of the display board 3 for erasing.

Figure 5:
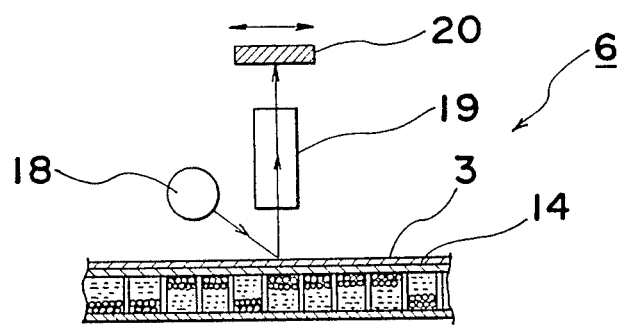
FIG. 5 is a schematic diagram showing construction of a board surface reading device employed in the arrangement of FIG. 1.

Referring also to FIG. 5, the board surface reading device 6 generally includes a light source 18 for irradiating light energy towards the side of the front face sheet 14 of the magnetic migration display board 3, a lens assembly 19 for collecting reflected light representing the varying density of the image drawn on the display board 3 and a photo-electric converting element 20 (e.g. a CCD or charge coupled device, referred to merely as CCD hereinafter) for converting the intensity of the collected light into electrical signals.

The magnetic recording head device 4, the magnetic erasing head device 5 and the board surface reading device 6, as described above, may be provided as separate devices respectively or formed into one unit by mounting all these devices onto one carriage.

Figure 6A:
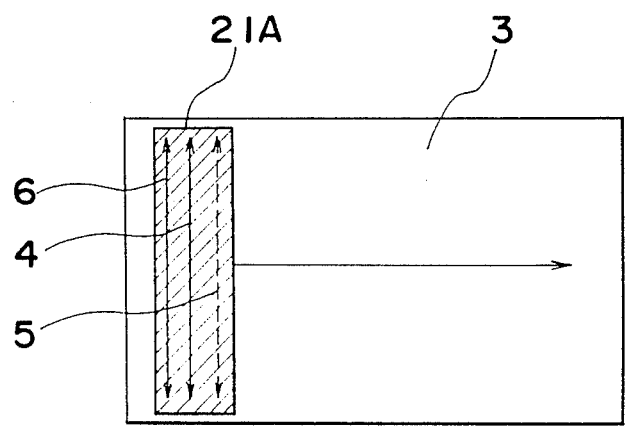
FIGS. 6(a) and 6(b), and 12(a) and 12(b) are schematic diagrams showing constructions of carriages which may be employed in the arrangement of FIG. 1.
Figure 6B:
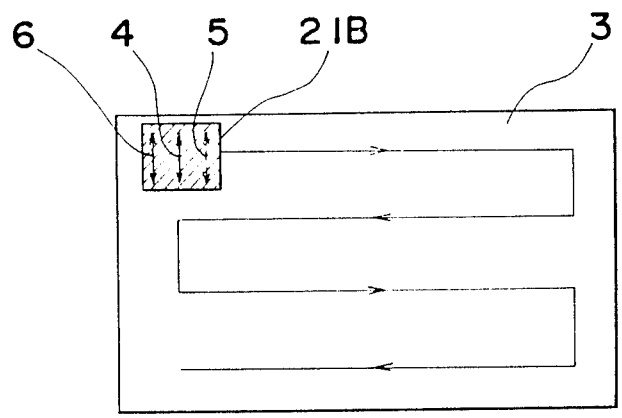

FIGS. 6(a) and 6(b) show carriages 21A and 21B, in each of which the magnetic recording head device 4, the magnetic erasing head device 5 and the board surface reading device 6 are all mounted thereon.

In the carriage 21A, being a line type, in FIG. 6(a), scanning (displacement) of the heads may be simply accomplished, with a consequent high speed for drawing one image face, whereas there are problems in the aspects of power consumption and cost. Meanwhile, in the carriage 21B, being a serial type, in FIG. 6(b); scanning (displacement) of the heads becomes complicated with an increase in the drawing time due to the small number of elements, but there are advantages in the aspects of power consumption and cost. Adoption of either one of the above two types may be properly determined depending on the size of the system, objective of utilization, etc.

Figure 12:
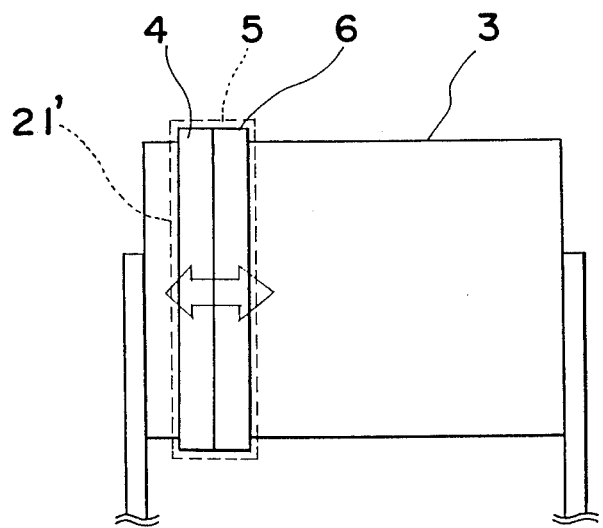
Figure 12:
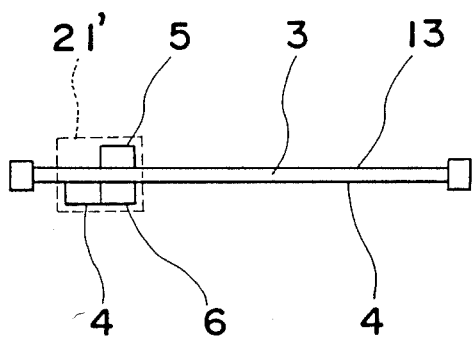

In FIGS. 12(a) and 12(b), there are shown a front elevational view and a top plan view representing one example of detailed construction for a carriage 21' mounted thereon with the magnetic recording head device 4, magnetic erasing head device 5, and board surface reading device 6 as referred to in FIG. 6, with like parts in FIG. 6 being designated by like reference numerals for brevity of description. By the construction as in FIGS. 12(a) and 12(b), the magnetic recording head device 5 and the board surface reading device 6 are simultaneously driven on the display board 3 for scanning.

Subsequently, erasing operation for the magnetic migration display board 3 will be described in detail below.

Although the magnetic erasing head device 5 may be so arranged as to erase the entire surface from the side of the reverse face sheet 13 of the display board 3, it is impossible to erase partially, or for rewriting on a portion of the board. It is necessary to erase the whole surface once before renewal of the contents, including that at the portion not required to be rewritten, can be rewritten on the entire surface, thus taking much time for the purpose.

Therefore, the magnetic recording head device 4, magnetic erasing head device 5 and board surface reading device 6 are mounted on the same carriage 21, while the erasing head device 5 is disposed in a position preceding or prior to the recording head device 4 with respect to the running direction of said recording head device 4 during writing, and also, at the side of the reverse face sheet 13 of the display board 3.

By the above arrangement, for the erasing operation, the erasing may be accomplished by displacing the magnetic erasing head device 5 to the side of the reverse face sheet 13 in the region of the display board 3 desired to be erased, and selectively energizing the electromagnets for the region to be erased.

Meanwhile, for the rewriting operation, by simultaneously accomplished the writing operation as described earlier, by the recording head device 4 located behind the erasing head device 5, and the erasing operation by the erasing head device, a fresh image display may be formed on the magnetic migration display board 3 simultaneously with the erasing of the image display written on the display board 3.

Here, specific examples in which the magnetic recording head device 4 is positioned behind the magnetic erasing head device 5 will be described with reference to FIGS. 13(a) through 13(f). FIGS. 13(a), 13(b) and 13(c) represent one example for the line type referred to earlier. FIG. 13(a) is a front elevational view. FIG. 13(b) is a top plan view. FIG. 13(c) is a side elevational view thereof. While FIGS. 13(d), 13(e) and 13(f) denote another example of the serial type also referred to earlier, FIG. 13(d) is a front elevational view. FIG. 13(e) is a top plan view. FIG. 13(f) is a side elevational view thereof.

In each of the arrangements in FIGS. 13(a) to 13(f), the magnetic recording head device 4 is located at the side of the front face sheet 14, while the magnetic erasing head device 5 is positioned at the side of the reverse face sheet 13 of the magnetic migration display board 3. The recording head device 4 and the erasing head device 5 are provided in a positional relation such that the said erasing head device 5 is disposed at the position preceding the recording head device 4 by a length "a" in the direction of recording by the recording head device 4. Thus, during writing, the image initially written is first erased by the erasing head device 5, with fresh image information being recorded thereafter by the recording head device 4. This function is continuously accomplished.

Figure 7A:
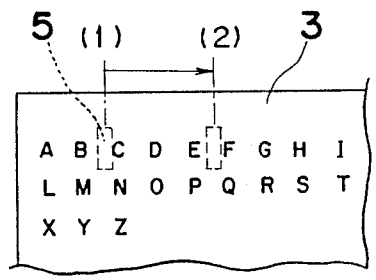
FIGS. 7(a) and 7(b) are exemplanary diagrams for demonstrating the erasing operation of the arrangement of FIG. 1.
Figure 7B:
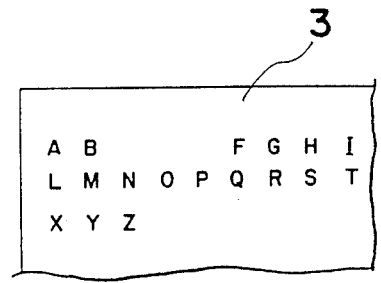

An example of the erasing operation in the image display system of the serial type referred to earlier with respect to FIG. 6(b) is as shown in FIGS. 7(a) and 7(b).

More specifically, by displacing the magnetic erasing head device 5 from a position (1) to a position (2) in FIG. 7(a), characters "C, D, E" as displayed are erased, and the state will become as shown in FIG. 7(b).

Similarly, one example of the writing operation will be described below with reference to FIGS. 8(a) and 8(b).

Figure 8A:
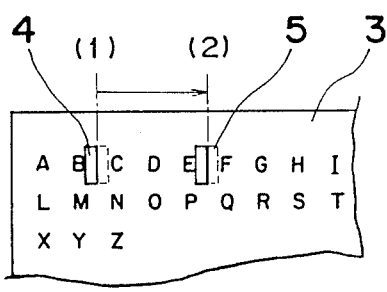
FIGS. 8(a) and 8(b) are diagrams similar to FIGS. 7(a) and 7(b), which particularly show the rewriting operation of the arrangement of FIG. 1.
Figure 8B:
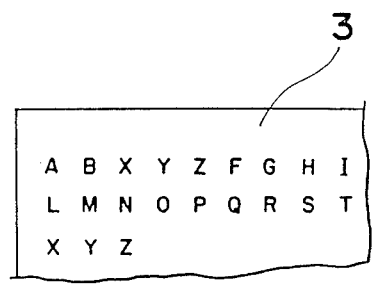

With the erasing head device 5 preceding in the moving direction and the recording head device 4 located behind the erasing head device 5 being both caused to function in the carriage 21, when the carriage is moved from a position (1) to another position (2) in FIG. 8(a), the characters "C, D, E" as displayed are erased by the magnetic erasing head device 5, while simultaneously, characters "X, Y, Z" are rewritten by the recording head device 4 as shown in FIG. 8(b).

The partial rewriting as described above is effective to deal with information varying with time (e.g. display of stock prices, display of information with respect to departure and arrival of transport facilities, etc.) besides corrections of erroneous display inputs.

Figure 9:
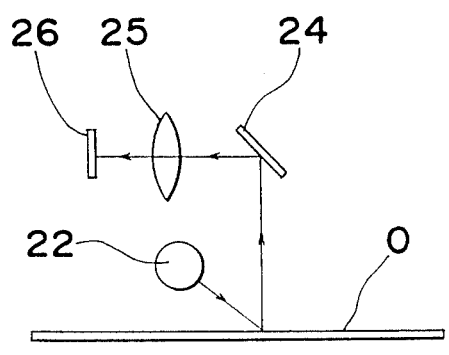
FIG. 9 is a schematic diagram showing one example of an original document reading device to be employed in the arrangement of FIG. 1.

The original document reading device 7 has the construction similar to that of an optical reading device conventionally employed in a facsimile equipment, and generally includes, as schematically shown in FIG. 9, a light source 22 for projecting light energy onto an original document O, and a mirror 24 for directing light reflected by the original document 0 towards a photoelectric converting element 26 (e.g. CCD) through a lens assembly 25. With respect to the scanning system of the original document O, there may be raised two types, i.e., the original document stationary type and original document transport type, and in the present embodiment, either of the two types may be employed depending on necessity.

Figure 10:
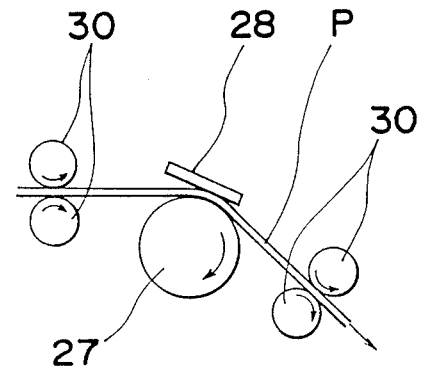
FIG. 10 is a schematic diagram showing one example of a recording device to be employed in the arrangement of FIG. 1.

Meanwhile, the recording device 8 also has the construction similar to a line thermal printer using the heat sensitive paper and conventionally employed in a facsimile equipment, and generally includes, as schematically shown in FIG. 10, a platen roller 27, a thermal head 28 disposed in a position confronting the platen roller 27, and a plurality of sets of transport rollers 30 for transporting a heat sensitive paper P through between the platen roller 27 and the thermal head 28 which records, through head sensitizing, on the paper P according to image data read by the original document reading device 7 or the board surface recording device 6.

Subsequently, one example of application of the image display device according to the present invention as described so far will be explained.

With respect to a meeting, it is assumed that the conference proceeds in the order as follows.

(i) Distribution of data preliminarily prepared by the sponsor, (ii) Explanation of the data, and confirmation of progress of the discussion, (iii) Recording of the result of the debating.

Work related to the above item (i) is accomplished by the original document reading device 7 and the recording device 8 described earlier. More specifically, the data prepared in advance is read by the reading device 7 for printing output by the recording device 8. By distributing the paper thus printed, it is not necessary to preliminarily prepared copied data, and moreover, it is possible to cope with an increase in the number of persons present.

Meanwhile, work for the item (ii) may be accomplished by the original document reading device 7 and the magnetic migration display panel 3, and the magnetic erasing head device 5 and the magnetic recording head device 4 in the manner, for example, as follows.

The data preliminarily prepared is read by the reading device 7, and the image of the original document thus read is displayed (written) on the display board 3 by the recording head 4. When the image of the original document is thus displayed on the display board 3, additional comments to the displayed contents may be manually written onto the display board 3 by a felt tipped pen or the like as in an ordinary white board. Such additional comments may be emphasized or classified by colors through the realization that various colors are available for the felt tipped pens, and thus, an explanation easy to understand and clear presentation may be accomplished through the display board 3.

Work related to the item (iii) may be accomplished by the board surface reading device 6 and the recording device 8 as in a conventional so-called electronic blackboard, for example, the data on the display board 3 is read by the board surface reading device 6 so as to be printed for output by the recording device 8.

Subsequently, the series of procedures as described in the above items (i), (ii) and (iii) will be briefly explained with reference to FIGS. 11(a) to 11(d).

Figures 11A, 11B:
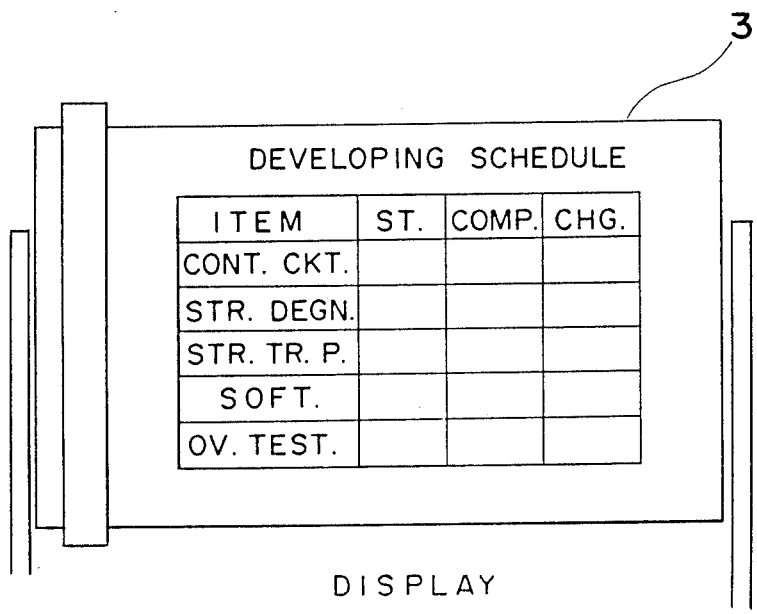
FIGS. 11(a) to 11(d) are diagrams showing applications of the arrangement of FIG. 1.
Figures 11C, 11D:
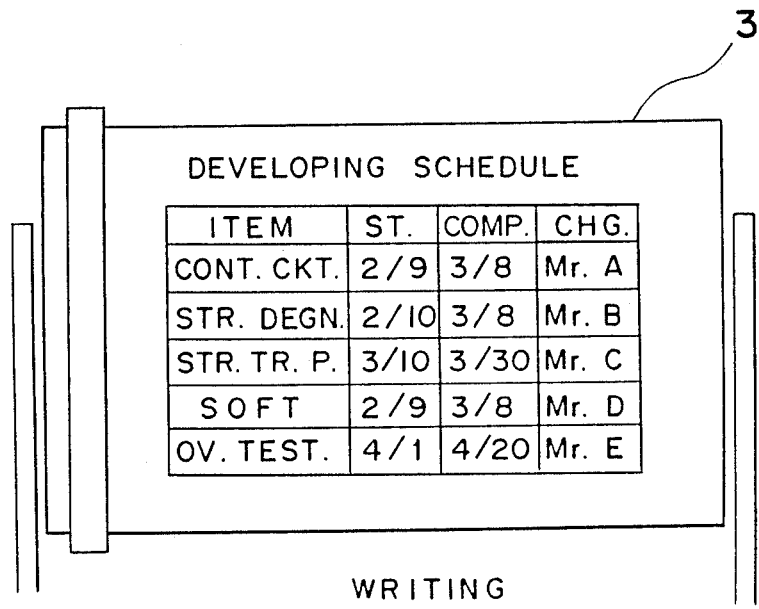

The original document as shown in FIG. 11(a), for example, for DEVELOPING SCHEDULE, is first read by the original document reading device 7 for display on the display board 3 of the board section 1 of the image display system according to the present invention. The original document thus displayed is only written with a heading such as CONTROL CIRCUIT, STRUCTURE DESIGN, STRUCTURE TRIAL PRODUCTION, SOFT, OVERALL TEST, and START, COMPLETION, PERSON IN CHARGE, etc., without entry of date or schedule as shown in FIG. 11(b). Here, the data and schedule discussed at the conference are written by hand on the display board 3 with the felt tipped pen or the like as shown in FIG. 11(c). When the image information in FIG. 11(c) is read by the board surface reading device 6 for printing output by the recording device 8, copies additionally written with the schedule may be obtained as shown in FIG. 11(d).

In the erasing and rewriting operations referred to earlier, it is stated that the magnetic erasing head device 5 and the magnetic recording head device 4 are properly selected to be driven, and for the actual application, such a practice as to designate the region to be erased or rewritten by the operating device 10 (FIG. 1) is employed for the purpose.

Meanwhile, if a documentation machine (referred to as a word processor hereinafter) is employed, documents prepared by such word processor may also be displayed on the magnetic migration display board 3, whereby editing of various documents can be facilitated. Conversely, when the original document read by the original document reading device 7 or the image read by the board surface reading device 6 are administrated by such word processor, it is made possible to file the data in a magnetic medium (e.g. floppy disc).

As is clear from the foregoing description, according to the image display system of the present invention, since the information written on the paper sheet may be displayed on the display board, while the image information displayed on the display board can also be printed on a paper sheet, functions commonly serving as an electronic blackboard and an OHP are available, and thus, the distribution of the data, display of the data, entry and display of necessary items, recording of results of discussion, etc. may be conveniently effected only by this image display system in an efficient manner.

Furthermore, since the image erasing means is arranged to scan over the image display means by preceding the recording means, fresh image information may be displayed immediately after erasing of the displayed information, and therefore, rewriting of the information can be readily effected in a short period of time.

Moreover, by the image display system of the present invention, the information on the image display means may be read by the image reading means. Furthermore, since the image reading means, image recording means and image erasing means can be simultaneously driven for scanning, rewriting of the information and output of the information before erasing may be accomplished simultaneously and quickly.

Additionally, owing to the fact that information may also be manually written on the display board by a felt tipped pen or the like, it is possible to add data, etc. onto the display board.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image display system having a display board, comprising:
    information reading means for reading information;
    information display means for displaying said information read by said information reading means; and
    copying means for producing an output representing said information being displayed on said information display means;
    said information display means including,
        information writing means for writing information onto the display board, and
        information erasing means for erasing information from the display board,
        said information erasing means preceding said information writing means with respect to a direction for writing said information onto the display board.

2. The image display system as claimed in claim 1, wherein said information display means is a magnetic migration display system.

3. The image display system as claimed in claim 1, wherein said information recording means and said information reading means are positioned on a same surface side of said information display means; and
    said information erasing means being positioned on a surface side of said information display means opposite of said information recording means and said information reading means.

4. An image display system having a display board, comprising;
    information display means for displaying information;
    information recording means for writing information onto said information display means; and
    information erasing means, provided at a position preceding said information recording means with respect to a direction for writing said information onto the display board, for erasing said information displayed on said information display means.

5. The image display system as claimed in claim 4, wherein said information display means is a magnetic migration display system.

6. The image display system as claimed in claim 4, wherein said information erasing means being positioned on a surface side of said information display means opposite of said information recording means.

7. An image display system having a display board, comprising:
    information display means for displaying information;
    information recording means for writing information on said information display means;
    information reading means for reading the information written on said information display means; and
    information erasing means for erasing the information written on said information display means;
    said information erasing means being arranged in a position preceding said information recording means with respect to a direction for writing information onto the display board.

8. The image display system as claimed in claim 7, wherein said information recording means and said information reading means are provided on a same surface side of said information display means; and
    said information erasing means being provided on a surface side of said information display means opposite of said information recording means.

9. The image display system as claimed in claim 7, wherein said information display means is a magnetic migration display system.

10. The image display system as claimed in claim 7, wherein said information recording means and said information reading means are positioned on a same surface side of said information display means; and
    said information erasing means being positioned on a surface side of said information display means opposite of said information reading means and said image reading means.

11. An image display system having a display board, comprising:
    information display means for displaying information;
    information recording means for writing information on said information display means;
    information reading means for reading the information written on said information display means; and
    information erasing means for erasing the information written on said information display means;
    said information recording means, said information reading means, and said information erasing means being arranged to simultaneously scan over said information display means.

12. The image display system as claimed in claim 11, wherein said information recording and said information reading means are positioned on a same surface side of said information display means; and said information erasing means being positioned on a surface side of said information display means opposite of said information recording means and said image reading means.

13. An image display system comprising:
image display means for displaying image information;
image recording means for writing image information on said image display means;
image reading means for reading the image information written on said image display means; and
image erasing means for erasing the image information written on said image display means;
said image information being displayed and erased on said display means by causing magnetic particles located in said image display means to migrate upon application of magnetic forces to said image display means and being manually written upon said image display means by a hand-writing device.

14. The image display system as claimed in claim 13, wherein said hand-writing device is a felt-tipped pen.

15. The image display system as claimed in claim 13, wherein said image recording and said image reading means are positioned on a same surface side of said image display means; and said image erasing means being positioned on a surface side of said image display means opposite of said image recording means and said image reading means.

16. A method for disseminating information from a display board, comprising the steps of:

(a) reading information from an original document;
(b) erasing the display board with a magnetic erasing device; and
(c) writing the information read in said step (a) on the display board with a magnetic writing device during the erasing process being carried out in said step (b) such that steps (b) and (c) are carried out in a single scan of the display board.

17. The method as claimed in claim 16 further comprising the steps of:

(d) copying the information written on the display board; and
(e) outputting the information copied in said step (d) to a device which stores the copied information on a magnetic medium.

18. The method as claimed in claim 17 further comprising the step of:

(f) writing additional information with a felt-tipped marker onto the display board after executing said step (c).

19. The method as claimed in claim 17 further comprising the step of:

(f) writing additional information with a felt-tipped marker onto the display board after executing said step (c).

20. The method as claimed in claim 16 further comprising the steps of:

(d) copying the information written on the display board; and
(e) outputting the information copied in said step (d) to a device which produces a hard copy of the copied information.

* * * * *